US006749431B2

(12) United States Patent
Smith et al.

(10) Patent No.: US 6,749,431 B2
(45) Date of Patent: Jun. 15, 2004

(54) APPARATUS AND METHOD FOR CONNECTING SIMULATOR INSTRUMENTS TO A CONTROL SYSTEM

(75) Inventors: Hoke Smith, Azle, TX (US); James Johnson, Arlington, TX (US); Eric Dickey, Dallas, TX (US)

(73) Assignee: Control Products Corporation, Grand Prairie, TX (US)

(*) Notice: Subject to any disclaimer, the term of this patent is extended or adjusted under 35 U.S.C. 154(b) by 30 days.

(21) Appl. No.: 10/202,786

(22) Filed: Jul. 25, 2002

(65) Prior Publication Data
US 2004/0018481 A1 Jan. 29, 2004

(51) Int. Cl.[7] .............................. G09B 9/02; G09B 9/08
(52) U.S. Cl. .............................. 434/29; 434/30; 434/55
(58) Field of Search ........................... 434/29, 30, 31, 434/33, 34, 35, 45, 55, 60, 61, 62

(56) References Cited

U.S. PATENT DOCUMENTS

| 5,017,141 A | 5/1991 | Relf et al. ................... 434/29 |
| 5,474,454 A | 12/1995 | Knapp et al. ................. 434/29 |
| 6,077,077 A | 6/2000 | Geipe ........................... 434/30 |
| 6,106,298 A * | 8/2000 | Pollak .......................... 434/29 |
| 6,109,920 A | 8/2000 | Shih et al. .................... 434/37 |

OTHER PUBLICATIONS

Draft Subsystem Specification For the F–16 Mission Training Center Cockpit Subsystem, Mar. 24, 1999, Prepared by Hoke Smith.

* cited by examiner

Primary Examiner—John Edmund Rovnak
(74) Attorney, Agent, or Firm—John A. Thomas

(57) ABSTRACT

An apparatus and method for connecting simulator instruments to a simulator host computer includes a plurality of panel modules, a data bus having a connection to each panel module, and a control computer connected to the data bus and to the host computer. Each panel module further comprises at least one simulated instrument and a local computer. The local computer runs a computer program adapted to the instrument or instruments controlled by that panel module, so that the local computer communicates with the data bus for bi-directional communication between the instrument and the control computer. Each panel module has a unique address on the data bus.

16 Claims, 7 Drawing Sheets

APPARATUS AND METHOD FOR CONNECTING SIMULATOR INSTRUMENTS TO A CONTROL SYSTEM

FIELD OF THE INVENTION

The present invention relates to simulator systems; in particular to an apparatus and method for connecting the various instruments and controls in a simulated aircraft cockpit or other simulated vehicle to the simulator control system.

BACKGROUND

Aircraft flight simulators train pilots to operate an airplane in a simulated environment. Simulators for other vehicles or human-controlled machines are also known. For example, simulators may be used to train pilots, drivers, or operators of such diverse systems as military vehicles, tanks, and artillery systems; and also trucks, trains, and construction equipment. One class of simulator digitally generates the functions of a real control panel as it would appear in an airplane (or other vehicle) under way, and displays a virtual control panel on a computer monitor. The other kind of simulator, to which the present invention is directed, provides the pilot with an exact working replica of the cockpit of a particular airplane or other machine, so the pilot can touch and operate a real control panel. The indications of the instruments on such a control panel are controlled to be consistent with the movement of the flight controls by the pilot, as well as the pilot's selection of instrument settings. Although the invention disclosed here is primarily discussed in the context of aircraft simulators, the reader should understand that other embodiments of the invention are possible and desirable for other types of vehicles and machines, and the term "pilot" should be understood to include the human operator of such other vehicles and machines.

Realistic simulators typically have control panels constructed of modular parts. Each such modular part represents a particular instrument, switch, display, or control. Each module must accept commands to change its display consistent with the simulation program, and must also send data to a central control system to tell that system what is its current state. In modern simulators, the control system is a computer programmed to generate the necessary commands to the simulator's instruments and controls. This method requires that many diverse devices communicate with this host computer. Moreover, this exchange of data and instructions must happen rapidly to keep the instruments realistically updated; typically 60 times per second.

In the prior art, the control panel modules and the host computer are connected with individual wires, via some sort of signal-conditioning interface between each panel module and the computer. Considering that each panel requires both power and data lines, the number of wires rapidly becomes bulky and unwieldy. There are two other main problems with this approach.

First, the large number of wires and connections creates a high probability of failure, and a corresponding difficulty in finding and fixing such faults. Second, modules of a given kind cannot readily be moved between different positions in the cockpit because the wiring associated with a particular module is fixed. Thus a new wiring harness is required. The same problem exists in moving instrument modules between simulators representing different models or configurations of the same aircraft or vehicle.

At least one prior-art patent, U.S. Pat. No. 5,017,141, to Relf, et al. attempts to solve this problem by moving the processing power from a central computer and distributing it among modules representing the major flight functions, such as engines, navigation, flight, and systems. The result is a complex distributed computer system involving a shared data bus, shared memory, multiple CPU's within each module, and exchange of data between the modules. This approach may solve the wiring-interconnect problem, but it does so at the cost of considerable complication to the calculation of instrument updates and flight control.

What is needed is a simple solution to the wiring problem that removes complexity from the connections to the panel modules, while also retaining the simplicity of a central host computer.

SUMMARY

We disclose an apparatus and method for connecting simulator instruments to a simulator host computer. The system includes a plurality of panel modules, a serial data bus (the data bus having a connection to each panel module), and a control computer connected to the data bus and to the host computer. Power wiring is preferably included in the same cable with the wiring for the serial data bus, thus allowing use of only one connector on the panel module.

Each panel module further comprises at least one instrument, where the "instrument" may be a control, a switch, or an indicator of some sort. Each panel module also has a local computer. This local computer is preferably a single-board computer further comprising a microprocessor, a read-only memory communicating with the microprocessor (for storing a computer program), and a signal-conditioning circuit connected to each instrument and the microprocessor. In each panel module, the computer program is adapted to the instrument or instruments controlled by that panel module.

The local computer communicates with the data bus for bi-directional communication between the instrument and the control computer. Each panel module has a unique address on the data bus.

The computer program running on the control computer has an input table associating each panel module address with data representing the current state of the instruments associated with that panel. It also has an output table associating data received from the host computer with each panel module address, and a process for detecting when instrument data is different from that previously stored in the output table for a given instrument. When the data is different, the instrument is commanded to update its reading by placing a message addressed to the particular panel module on the data bus.

Some instruments will not have indicators, but only states, such as switches, changed by the operator. In this case, the computer program running on the control computer receives state data from the panel modules and compiles a message to send to the host computer.

In the preferred embodiment a process for receiving a message from the control computer runs on the local computer. A process for determining if the message is addressed to the instrument also runs. If the control computer sends a message addressed to the instrument associated with the local computer, a process then runs for sending control signals from the local computer to the instrument to change the state of the instrument.

The local computer has a process for detecting a change in the state of the instrument, and a process for comparing the state of the instrument to its recorded state. If the current state and the recorded state differ, a process runs for sending a message to the control computer so that the control computer can update its input table entry for that instrument.

DRAWINGS

DETAILED DESCRIPTION

A simulated aircraft cockpit typically has the same instruments and controls as an actual aircraft. These include an artificial horizon, an altimeter, an air-speed indicator, navigation and communication radios, gauges monitoring engines, fuel and other aircraft systems, and the flight controls. The simulated instrument panel will also have various switches, such as flap settings, power settings, and radio controls that are set by the pilot. Military aircraft simulators may have instruments and controls for weapons systems, radars, and the like. In this application, all of the foregoing instruments, controls, and switches are referred to as "instruments," unless otherwise stated. Of course, simulators for other vehicles or machines will have different controls or displays, and the description following is thus not limited to aircraft.

All modern simulators have a programmed computer, provided by the simulator manufacturer, running software that drives the simulation. In this application, this computer is called the "host computer."

Figure 1:
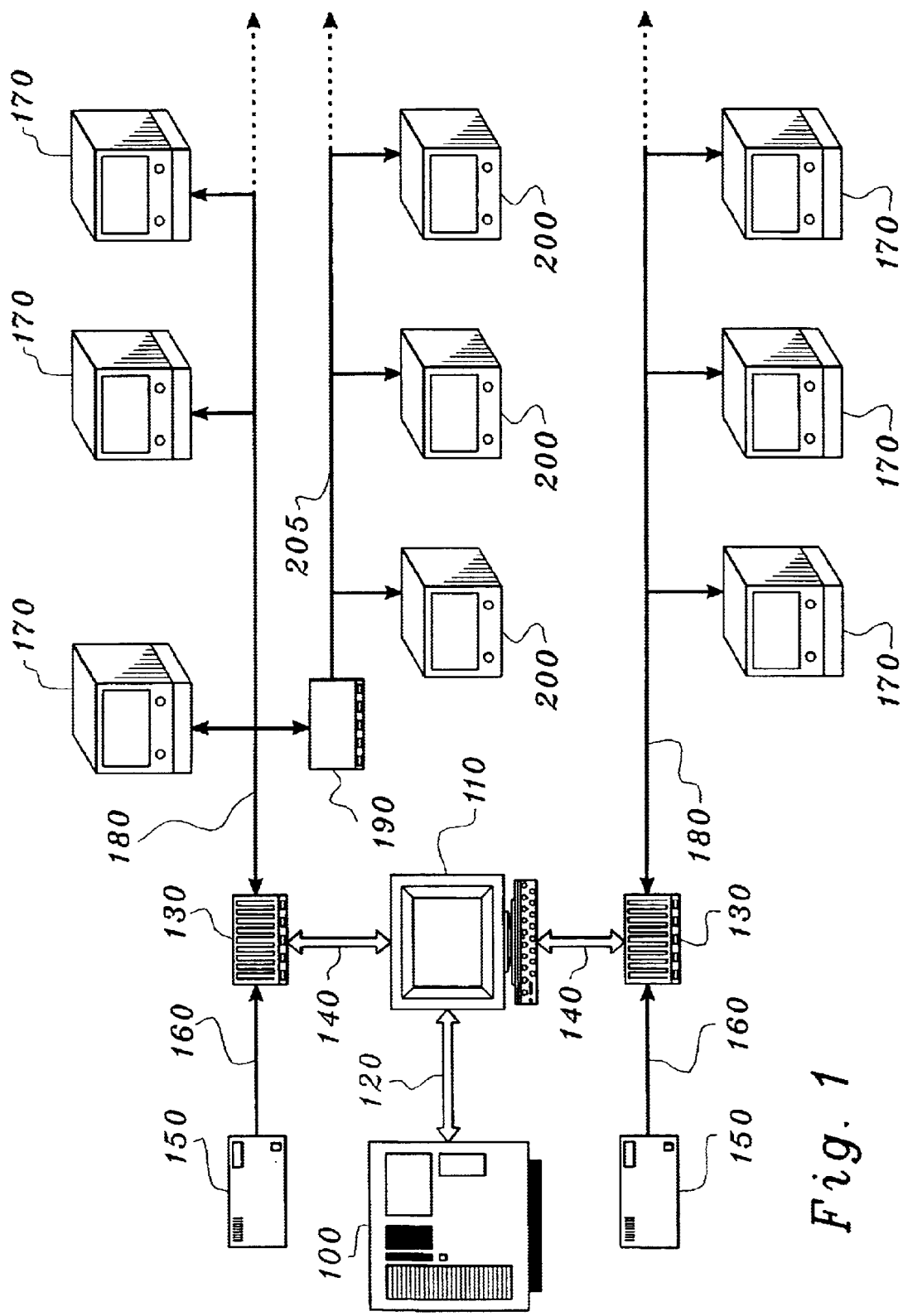
FIG. 1 is a block diagram showing schematically the connections between a host computer, the control computer, and the panel modules in the simulated cockpit of the preferred embodiment.

FIG. 1 is a block diagram showing schematically the connections between a host computer (100), a control computer (110), and a plurality of panel modules (170) in the simulated cockpit of the preferred embodiment. Each panel module (170) has a self-contained or "local" computer (250) having a microprocessor (270), random-access memory, and a read-only memory (275) with a stored program. As discussed below, and shown in FIG. 2, each panel module (170) includes typical instruments (220, 230, 240), identified generally with reference numeral 200.

In the preferred embodiment, the control computer (110) communicates with the host computer (100) through a high-speed data connection, such as the Ethernet standard. Preferably, communication between these computers is done using the User Datagram Protocol (UDP), as described in J. Postel, "User datagram protocol," Request for Comments 768, Internet Engineering Task Force, August 1980.

The host computer (100) is provided by the simulator vendor. It calculates the simulated position, attitude, speed, etc. of the simulated aircraft and generates updates to the aircraft instruments to reflect changes in all relevant simulation parameters. The control computer (110) of the preferred embodiment receives such data from the host computer (100) and transmits it to the appropriate panel modules (170). The control computer (110) receives updates from these panel modules (170) and transmits those updates to the host computer (100) at a predetermined rate. Typically the updates are transmitted at a rate of 60 Hz or greater.

Referring to FIG. 1, the control computer (110) communicates with the panel modules (170) by a data communications means. The preferred embodiment uses the RS485 communications standard, although other, similar communication means could be used. The RS485 standard provides a balanced transmission line in a multi-drop configuration. Up to 32-nodes (drivers and receivers) are allowed on one multi-drop, bi-directional network. Data rates of up to 10M bps are supported over short distances (40 ft.). At the four-thousand foot distance limit, data rates of up to 100K bps are allowable. RS485 specifies a two-wire, half-duplex communications bus. The RS485 standard only specifies electrical characteristics of the driver and the receiver; it does not specify or recommend any protocol. This application describes a particular protocol for the preferred embodiment. However, other and similar protocols could be used.

In the preferred embodiment, the control computer (110) is connected via data lines (140) to junction boxes (130). Although not required in the most general embodiments, it is preferable in complex simulators to divide the simulated "cockpit" into different areas, where groups of particular instruments may be located. The junction boxes (130) depicted in FIG. 1 assist this logical arrangement. Each junction box (130) receives a data line (140) from the control computer (110) and also a power connection from a power supply (150). The power supply (150) is necessary to provide power to the local computers (250) within each panel module (170) and also to the switches, lights, indicators, and so forth that may be associated with a particular panel module (170).

It may also be convenient to use a distribution box (not shown) to distribute the data lines (140) from the control computer (110) in several lines to the respective junction boxes (130).

The junction box (130) combines the power lines (160) and the data lines (140) into one cable for transmission of both data communications and power. This combined cable (usually several such cables), which thus supports the data bus (180) connects the panel modules (170) with the control computer (110) and the power supplies (150). An advantage of the system is that the combined lines may have as few as four wires. It is preferably connected to the junction boxes (130) and the panel modules (170) by standard connectors. This makes it simple and foolproof to remove a panel module (170) from one position in the simulated cockpit and move it to another position near a different junction box (130), or to a different simulator entirely.

FIG. 1 also shows a remote module (190). Such remote modules (190) may be used where the particular instrument (often a simple switch or indicator light) is too small to include a local computer (250). In this case, the remote module (190) receives the combined power and data line and contains the local computer (250). The local computer (250) (and any necessary power) is then connected to an instrument (200) by discrete wiring (205). As described below, the remote module (190) communicates with the control computer (110) for all of the functions of the several such instruments (200) that may be connected with it.

The reader should understand that FIG. 1 is typical and schematic, and the number of junction boxes (130), remote modules (190), panel modules (170) and stand alone instruments (200) will generally be greater in actual simulators. Regardless, as many instruments as required may easily be connected to the power and data lines (160, 140) and placed into communication with the control computer (110).

Figure 2:
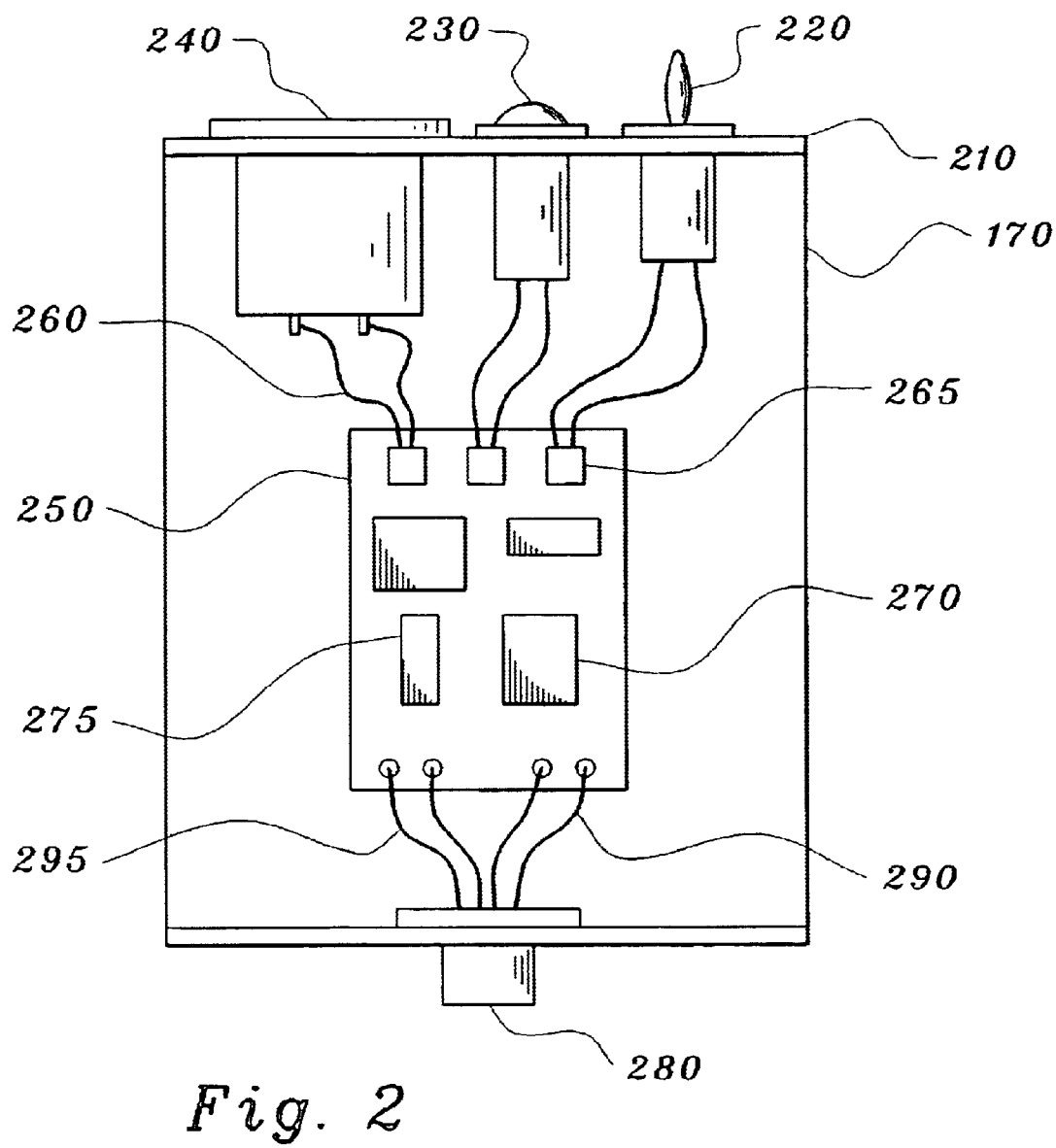
FIG. 2 is a block diagram showing components comprising a typical panel module of the preferred embodiment.

FIG. 2 shows a typical panel module (170). Such a module has a face plate (210) that supports various instruments (200). In the example shown, the instruments (200) include a switch (220), a light (230), and an indicator (240) of some sort. These instruments (200) are connected to the local computer (250) by wiring (260) to signal conditioning circuits (265) on the local computer (250). The local computer (250) connects through power wires (290) and data wires (295) to a connector (280), usually on the rear of the panel module (170). This connector (280) receives the combined power and data lines (160, 140). In this way, all panel modules (170) and any remote modules (190) are connected to the data bus (180).

The remote module (190) is similar to panel module except that instruments (200), such as a single switch (220) are remotely connected by discrete wires (205), exactly as with the connecting wiring (260) within a panel module (170). The remote module (190) also has a local computer (250) with signal-conditioning circuits (265) connected to the discrete wires (205), and a connector (280) to the combined power and data cable.

The local computer (250) has a microprocessor (270) and a programmable memory (275), such as a Flash EEPROM memory chip. As described below, this memory (275) is programmed with a computer program adapted to the particular instrument (200) that the local computer (250) supervises.

Many different microprocessor chips are known, and many are sold incorporated into "single-board" computers, having the microprocessor, memory, and analog-to-digital conversion functions provided on the board. Suitable single-board computers are the BL2000 and the BL1800 manufactured by Z-World of Davis, Calif. These models both use the RABBIT microprocessor manufactured by Rabbit Semiconductor of Davis, Calif. The BL2000, for example, has eleven digital I/O inputs, eight digital I/O outputs, eleven 12-bit A/D inputs, two analog outputs, and four serial ports, supporting both RS-232 and RS-485 standards. These and similar inputs and outputs are referred to here as "signal-conditioning circuits." The BL2000 has 128K of Flash EEPROM. A C-language development system is also available, and compiled programs may be downloaded into the Flash EEPROM. In the preferred embodiment, this allows each local computer (250) to be specifically programmed for the instrument or instruments (200) it supervises.

Figure 3:
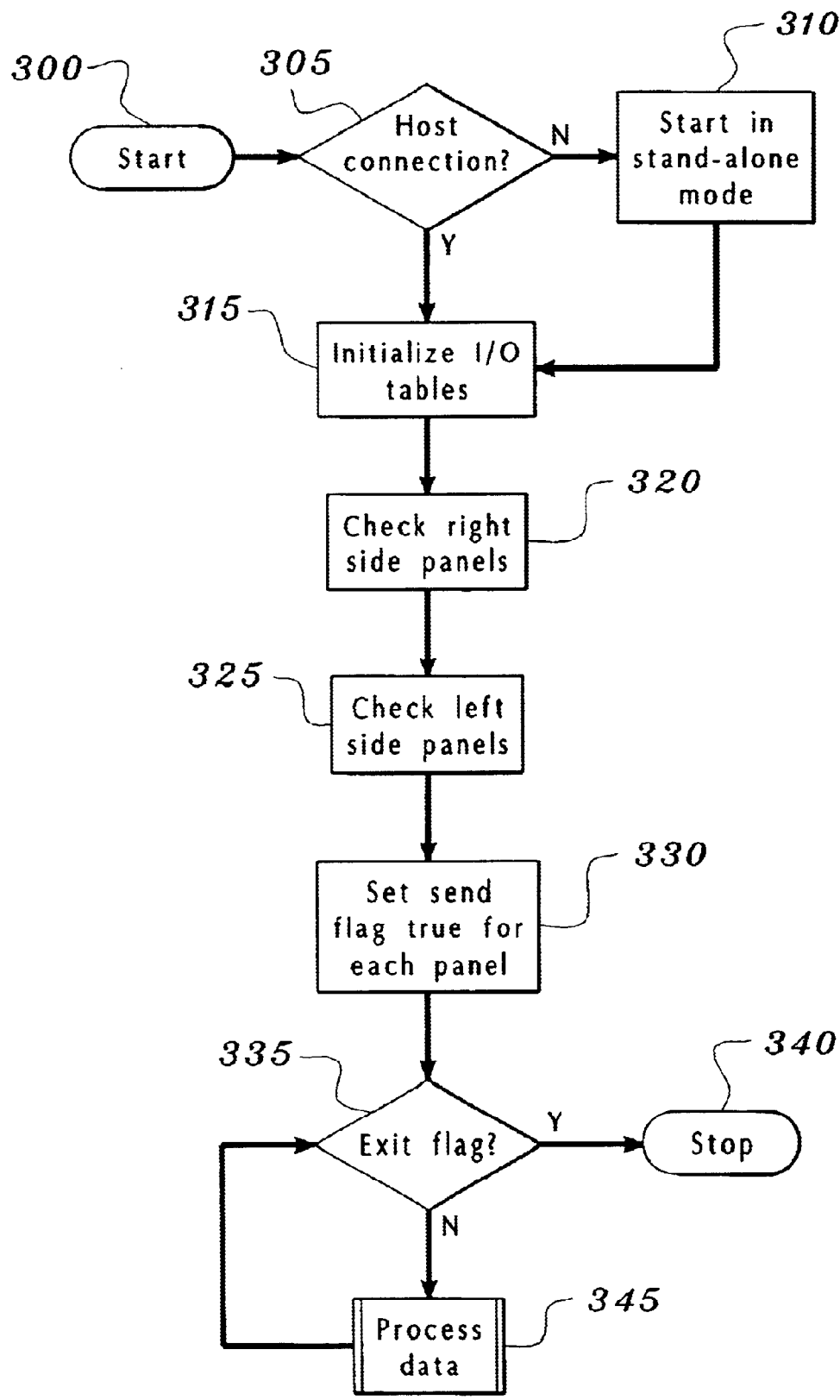
FIGS. 3 through 5 are flowcharts depicting the functions of the communications and control software in the control computer of the preferred embodiment.
Figure 4:
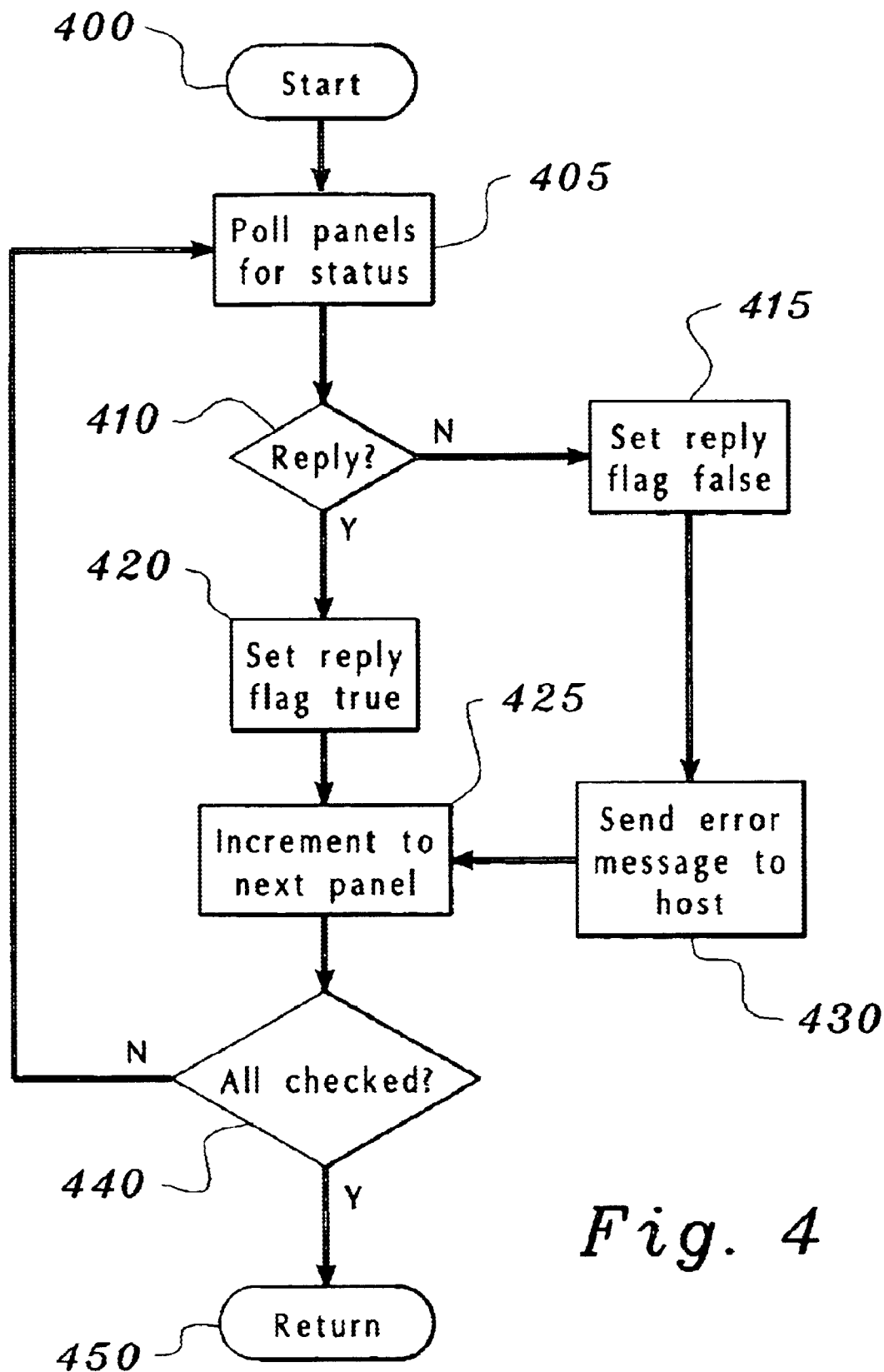
Figure 5:
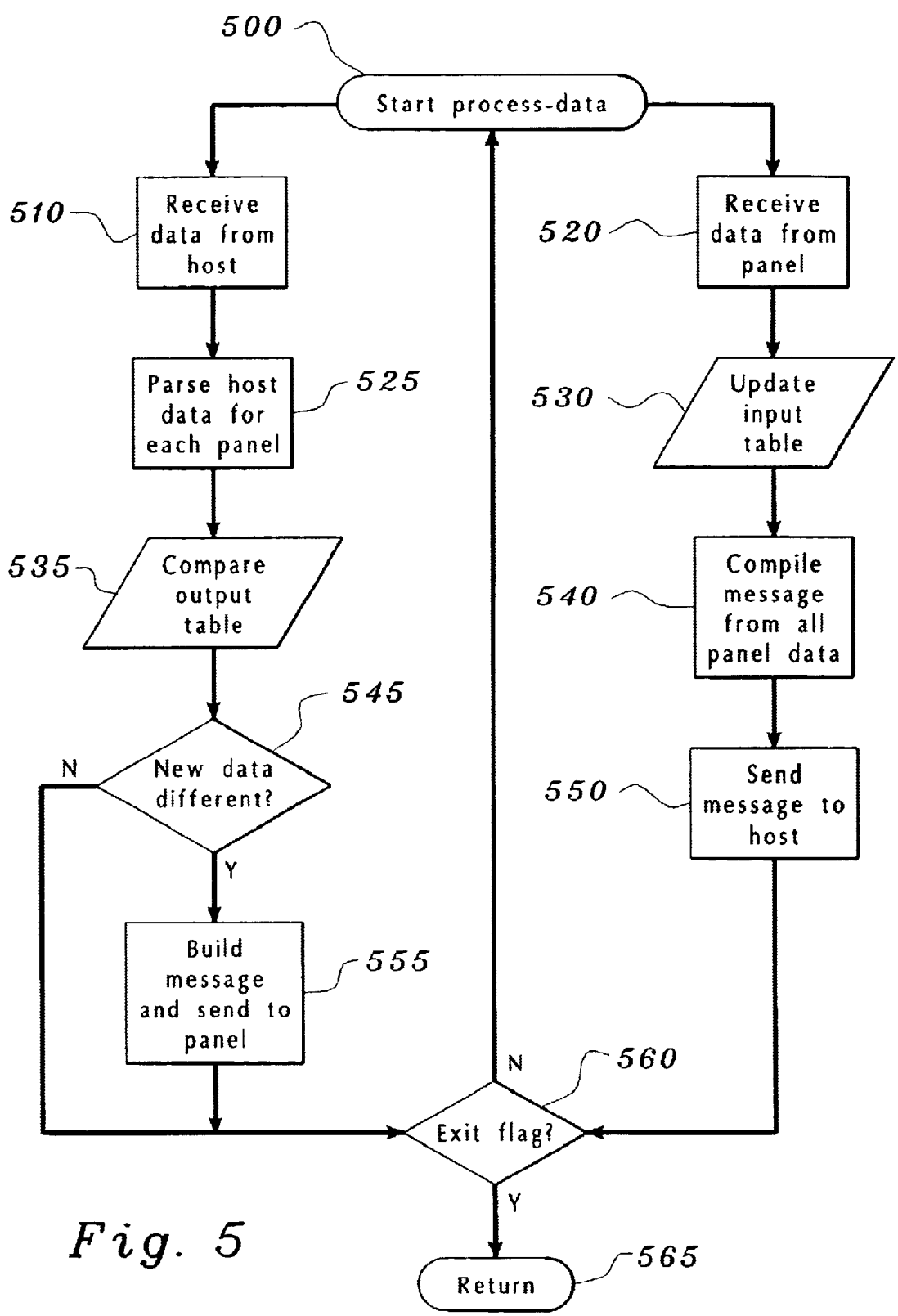

FIGS. 3, 4 and 5 show the flow of execution of the program stored on the control computer (110). The control computer has a CPU, disk storage, and RAM, and may be a suitably-configured personal computer running the Microsoft Corporation WINDOWS NT operating system. The control program may be written in the Visual Basic programming language by Microsoft Corporation. Preferably, the control program will have a graphical user interface. Design of graphical user interfaces is well known in the programming art.

FIG. 3 depicts the start-up procedure for the control computer (110). At the start step 300, the control computer (110) has been powered up. At step 305 the procedure checks for a connection with the host computer (100). If no connection is found, the control computer (110) starts the system in stand-alone mode at step 310. In either event, the input and output data tables are initialized at step 315. In the preferred embodiment, an input table holds the current state of each panel module (170), and an output table stores data received from the host computer (100).

Typically, the user of the control computer (110) will agree with the vendor of the host computer (100) about the number and type of panel modules (170) to be placed in the simulator. The size of each input table entry depends on how many input devices (switches, buttons, controls, etc.) are on the panel module for that entry. The output table entry size depends on the number and type of output devices (lights, meters, etc.), and by the amount of data each individual instrument (200) in the panel module requires to drive its output. In practice, this varies between 1 bit (a light on or off, for example), and 12 bits (an analog display, for example).

In steps 320 and 325, the program checks the panel modules (170) to get the current instrument state. A left-side and right-side check are shown, as is typical in aircraft simulators, but other simulators may check all instruments (200) at once, or have different logical divisions of instrument groups. If there is a reply from the instrument (200), the instrument state is recorded in the table entry associated with that instrument's address and a "send" flag is set true for that instrument (200) in step 330; if there is no reply, the program sends an error message to the host computer (100). Step 335 checks to see if the exit flag is set; if it is, the program enters a shut-down routine at step 340. Otherwise the program enters its main loop to process data at step 345.

FIG. 4 provides more detail for the initial check-panel steps 320 and 325 shown in FIG. 3. The program running on the control computer (110) polls a panel for its state at step (405). In the preferred embodiment, each panel module (170) has a unique address and listens on the RS485 bus for its address. If the control program receives a reply from the panel module (170) at step 410, it sets that panel module's reply flag to true at step 420 and increments to the next panel at step 425. If there is no reply, the reply flag is set false in step 415 and an error message is sent to the host computer (100) at step 430. Step 440 checks to see if all panels have been checked. If not, execution returns to step 405 for polling of the next panel. If all panels are checked, execution returns to step 330.

FIG. 5 depicts the main process loop in the control program. At this time, the simulator is fully operational and in use. The process-data mode of step 345, shown in more detail in FIG. 5, preferably comprises four separate processes continuously executing in parallel, until an exit command is received from the host computer (100). These processes are: (1) receive data from the host computer (100) at step 510, (2) send data to a panel module (170) at step 555, (3) receive data from a panel module (170) at step 520, and (4), send data to the host computer (100) at step 550. Data arrives from the host computer (100) in whatever format the simulator vendor has elected to use. At step 525, the program parses this host data into relevant fields, such as the instrument (200) to be addressed, and the setting for that instrument (200). Step 535 compares the output data that associates an instrument state with a particular instrument (200) to that stored in the output table. Decision step 545 switches execution to step 555 if this data is different from that currently stored in the output data table in the control computer (110). Step 555 builds a message in the communications protocol used to communicate with the panel modules (170) and places the message on the data bus (180) with the address of the particular panel module (170) to be updated. If the data is not different, the program loops at step 565 (assuming the exit flag is not set) to start its process over at step 500.

By way of illustration, the preferred embodiment uses the following protocol to send a message to a panel module (170) (all values are in hexadecimal notation):

:[length], [command word], [panel address], [checksum], [message ID], [data];
Example:
:10, A0, 12, E80F, 0011, E000;

In the example the length of this message (including colons, semicolons and commas) is 10 bytes, the command word is A0, the panel module address is 12, the checksum is E80F, the message ID is 0011, and the data is E000. This example commands a landing-gear panel module at address 12 to turn on all three wheel lights.

Each switch position in the panel module is assigned one bit in the data field of the message. After determining whether the position variable is on or off (1 or 0), the value for all required positions is stored in the input table in the order previously determined. Gaps are padded with zero bits. Next, the parts of the message are set as described above.

The local computer (250) in each panel module (170) will read each message on the data bus (180), listening for its unique address, executing the appropriate command, and sending a message back to the control computer (110).

At step 520 the control program receives data from a panel module (170). At step 530, the input data table is updated to reflect the current instrument state. The program parses the data into the format required by the host computer (100) at step 540 and sends a message back to the host computer (100) at step 550. In the preferred embodiment, the message is sent over the Ethernet connection (120) using UDP. If no exit flag is set, execution continues as shown in FIG. 5.

It is important to realize that a panel module (170) may initiate communication with the control computer (110), and that it will do so when the local computer (250) in the panel module (170) detects a change in the state of the instrument (200) or instruments associated with that panel. For example, the pilot may have thrown a switch, set a new radio frequency, or moved the control stick.

Figure 6:
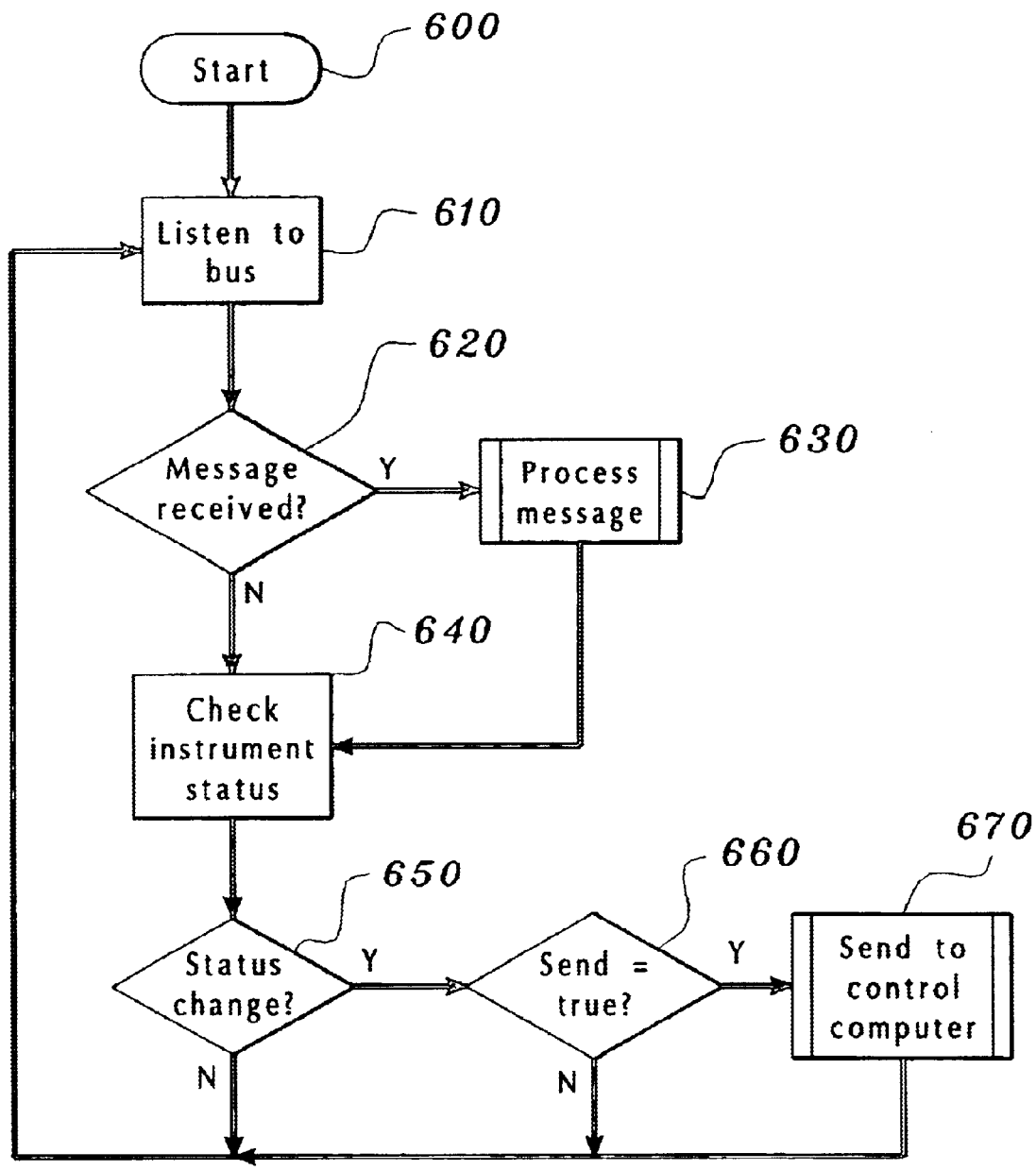
FIGS. 6 and 7 are flowcharts depicting the functions of the communications and control software in the panel modules of the preferred embodiment.
Figure 7:
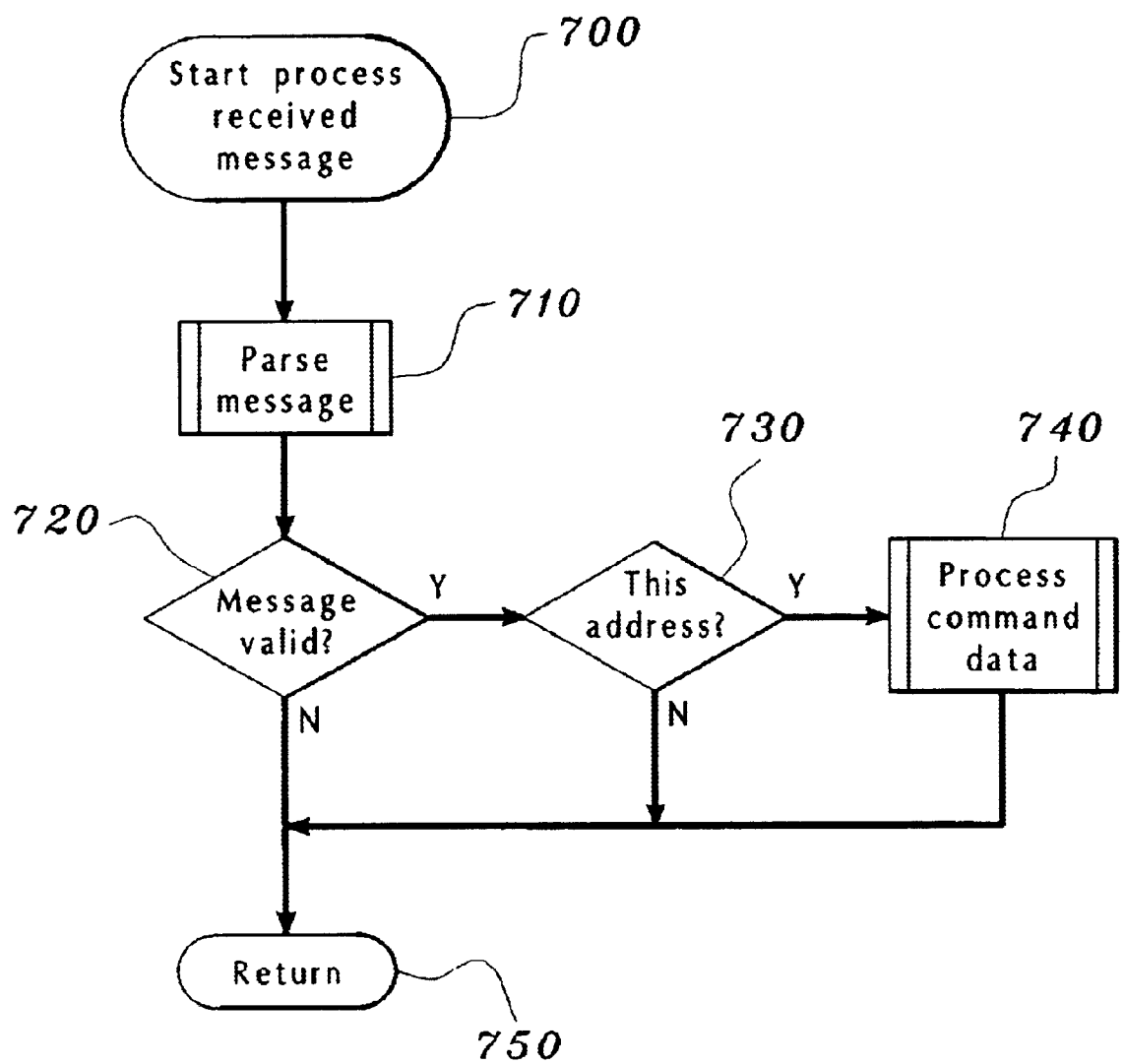

FIGS. 6 and 7 depict the program executing on the local computer (250) inside a panel module (170), or inside a remote module (190). The program stored in the programmed memory (275) of any local computer (250) is adapted to the particular instrument or instruments controlled by that panel module (170).

FIG. 6 shows the overall program flow on the local computer (250). At the start of the main loop at step 610, the program listens for its address on the data bus (180). Each message received is checked at step 620 to see if the message is addressed to the subject panel module (170). If so, the message is processed at step 630. Step 630 is explained in more detail in FIG. 7.

If the message received is not addressed to the subject panel module, or after a properly-addressed message is processed, execution flows to step 640, where the program checks the state of its associated instrument (200). If there is no state change, execution flows from decision step 650 back to the beginning of the loop at step 610. If there is a state change and the send flag is true (step 660), a message is composed and sent to the control computer (110). The state of the instrument is stored in the local RAM memory used by the microprocessor (270).

FIG. 7 shows the processing of a received message in the local computer (250). At step 710, the message is parsed to separate the data and verify the message checksum. If the message is valid, decision step 730 determines if the message is addressed to the subject panel module; if so, it sends it to step 740, where the command data is processed. The output of step 740 could be, for example, a signal, sent through a signal-conditioning circuit (265) to a panel light to turn on or off, or a serial command to an air-core meter to move its pointer to a certain angular position. After this, execution returns at step 750 to the main loop of the local computer.

Since those skilled in the art can modify the specific embodiments described above, we intend that the claims be interpreted to cover such modifications and equivalents.

We claim:

1. An apparatus for connecting simulator instruments to a simulator host computer, comprising:
    a plurality of panel modules;
    a data bus, the data bus having a connection to each panel module;
    a control computer connected to the data bus and to the host computer; and, each panel module further comprising:
        a local computer; the local computer communicating with the data bus;
        at least one instrument; and,
        the local computer further connected to the instrument, for bi-directional communication between the instrument and the control computer.

2. The apparatus of claim 1 above further comprising at least one remote module; the remote module further comprising a local computer; the local computer communicating with the data bus; and,
    a connection between the local computer in the remote module and at least one instrument,
for bi-directional communication between the instrument and the control computer.

3. The apparatus of claim 1 above, where each panel module has a unique address on the data bus.

4. The apparatus of claim 1 above where the local computer has a microprocessor and a read-only memory communicating with the microprocessor.

5. The apparatus of claim 4 above further comprising a computer program stored in the read-only memory.

6. The apparatus of claim 4 above where the computer program is adapted to control each type of instrument in the panel module.

7. The apparatus of claim 1 further comprising one or more power supplies, for supplying power to the panel modules.

8. The apparatus of claim 7 where the power supplies are connected to the panel modules by a cable; the cable further comprising wiring for the data bus.

9. The apparatus of claim 4 above where the local computer bus signal-conditioning circuits for connecting the instruments to the microprocessor.

10. The apparatus of claim 1 above where the data bus is a serial bus.

11. An apparatus for connecting simulator instruments to a simulator host computer, comprising:
    a plurality of panel modules;
    a serial data bus, the data bus having a connection to each panel module;
    a control computer connected to the data bus and to the host computer; and, each panel module further comprising:
        at least one instrument;
        a local computer; the local computer further comprising:
            a microprocessor;
            read-only memory communicating with the microprocessor, for storing a computer program; and, a signal conditioning circuit connected to each instrument and the microprocessor;

the local computer communicating with the data bus; for bi-directional communication between the instrument and the control computer; and each panel module having a unique address on the data bus.

12. A system for connecting simulator instruments to a simulator host computer, comprising:

a control computer communicating with the host computer;

a plurality of panel modules, each panel module further comprising a local computer and at least one instrument; each panel module having a unique address;

a data connection between the control computer and the panel modules;

a data connection between the control computer and the host computer;

an input table associating each panel module address with data representing the current state of the instruments associated with that panel; an output table associating data received from the host computer with each panel module address; and, a process for detecting when data representing the state of a given instrument is different from that stored in the output table for a given instrument.

13. The system of claim 11, further comprising a process for sending a message to an instrument when the state of that instrument as recorded in the output table is circuit from the current state of the instrument.

14. The system of claim 11, further comprising a process for sending a message representing the current state of an instrument to the host computer at a predetermined rate.

15. A system for controlling an instrument in a simulator comprising:

a control computer;

a local computer connected to the instrument, a data bus; the data bus connecting the local computer and the control computes a process for receiving a message from the control computer a process for determining if the message is addressed to the instrument; and, a process for sending control signals from the local computer to the instrument to change the state of the instrument.

16. The system of claim 14 further comprising:

a process for detecting a change in the state of the instrument;

a process for comparing the state of the instrument to its recorded state; and, a process for sending a message to the control computer if the current state and recorded states of the instrument are different.

* * * * *

UNITED STATES PATENT AND TRADEMARK OFFICE
CERTIFICATE OF CORRECTION

PATENT NO.    : 6,749,431 B2
DATED         : June 15, 2004
INVENTOR(S)   : Hoke Smith, James Johnson and Eric Dickey It is certified that error appears in the above-identified patent and that said Letters Patent is hereby corrected as shown below:

Column 9,
Line 28, the word "circuit" should be -- different --.

Column 10,
Line 9, the word "computes" should be --computers --.

Signed and Sealed this

Seventh Day of September, 2004

JON W. DUDAS
*Director of the United States Patent and Trademark Office*